United States Patent [19]

Schäfer et al.

[11] Patent Number: 4,945,137

[45] Date of Patent: Jul. 31, 1990

[54] BINDER COMBINATIONS AND A PROCESS FOR THE PRODUCTION OF FLAT MATERIALS

[75] Inventors: Walter Schäfer, Leichlingen; Hans Rudolph, Krefeld; Rolf Dhein, Krefeld; Hanns-Peter Müller, Krefeld; Michael Sonntag, Odenthal; Christian Wamprecht, Neuss; Harald Blum, Wachtendonk; Walter Krauss, Leverkusen, all of Fed. Rep. of Germany

[73] Assignee: Bayer Aktiengesellschaft, Leverkusen-Bayerwerk, Fed. Rep. of Germany

[21] Appl. No.: 415,863

[22] Filed: Oct. 2, 1989

[30] Foreign Application Priority Data

Oct. 12, 1988 [DE] Fed. Rep. of Germany ....... 3834750

[51] Int. Cl.$^5$ ................................................ C08F 8/30
[52] U.S. Cl. .................................. 525/375; 525/327.5; 525/327.6
[58] Field of Search .................. 525/375, 329.5, 329.6, 525/329.9, 327.5, 327.6

[56] References Cited

U.S. PATENT DOCUMENTS 2,543,602 12/1949 Rowland .......................... 525/327.6
4,626,575 12/1986 Goel ................................. 525/329.5

Primary Examiner—Joseph L. Schofer
Assistant Examiner—Jeffrey T. Smith
Attorney, Agent, or Firm—Connolly and Hutz

[57] ABSTRACT

A binder for a coating composition is a combination of
(a) polymers containing intramolecular carboxylic anhydride groups and having an average molecular weight of from 500 to 25,000 and
(b) organic compounds containing 4,5-dihydrooxazole groups in a quantity corresponding to an equivalent ratio of carboxylic anhydride groups to 4,5-dihydrooxazole groups of from 0.5:1 to 2:1, and contains from 0.005 to 5% by weight, based on the weight of components (a) and (b), of ammonia, a primary amine or secondary amine.

6 Claims, No Drawings

BINDER COMBINATIONS AND A PROCESS FOR THE PRODUCTION OF FLAT MATERIALS

This invention relates to new binder combinations based on polymers containing carboxylic anhydride groups and 4,5-dihydrooxazoles and to a process for the production of flat materials.

BACKGROUND OF THE INVENTION

The reaction of intramolecular carboxylic anhydrides with 4,5-dihydrooxazoles is a basically known chemical reaction. According to published European application 181,603, this reaction carried out, for example, in the presence of such catalysts as phosphites at a reaction temperature above 100° C. gives crosslinked products which, unfortunately, are yellow to brown in color so that the systems described in this publication are largely unsuitable as paint binders.

Rowland (U.S. Pat. No. 2,543,602) described the reaction of (i) copolymers of maleic anhydride with other olefinically unsaturated monomers with (ii) bis-2,4-dihydrooxazoles, the reaction preferably taking place at temperatures above 50° C.

Independent tests conducted by the present inventors have also confirmed that the reaction of maleic anhydride copolymers with 4,5-dihydrooxazoles takes place very slowly (gelation times of several days), particularly where the copolymers contain less than 25% by weight maleic anhydride. Accordingly, the known systems are unsuitable as paint binders for coating systems which require hardening in a few hours at room temperature.

BRIEF DESCRIPTION OF THE INVENTION

Surprisingly, it has now been found that it is possible by addition of ammonia, primary amines or secondary amines to considerably accelerate the crosslinking reaction, so that valuable binder combinations based on intramolecular copolymers containing carboxylic anhydride groups and 4,5-dihydrooxazoles can be obtained which harden quickly at room temperature.

DETAILED DESCRIPTION OF THE INVENTION

The present invention relates to binder combinations, optionally present in the form of solutions in suitable solvents, of (a) polymers containing intramolecular carboxylic anhydride groups and having an average molecular weight of from 500 to 25,000 and (b) organic compounds containing 4,5-dihydrooxazole groups in a quantity corresponding to an equivalent ratio of carboxylic anhydride groups to 4,5-dihydrooxazole groups of from 0.5:1 to 2:1, characterized by (c) a content of from 0.005 to 6% by weight, based on the weight of components (a) and (b), of ammonia or a primary or secondary amine.

The present invention also relates to a process for the production of flat materials by coating of any substrates with a coating composition which, in addition to a binder, contains the auxiliaries and additives typically used in coating technology, characterized in that a two component coating composition containing a binder combination of the type described above as binder is used.

Component (a) of the binder combinations according to the invention consists of copolymers known per se of olefinically unsaturated intramolecular carboxylic anhydrides, such as for example maleic anhydride, itaconic anhydride or bicyclo(2.2.1)heptene-5,6-dicarboxylic anhydride, preferably maleic anhydride, with other olefinically unsaturated monomers, such as for example ethylene, propylene, styrene or alkylacrylates or methacrylates containing from 1 to 8 and preferably from 1 to 4 carbon atoms in the alkyl group. The copolymers generally contain from 3 to 25% by weight and preferably from 5 to 15% by weight carboxylic anhydride groups corresponding to the following formula

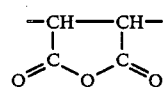

Their average molecular weight Mw, as determined by gel permeation chromatography, is generally in the range from 1,000 to 25,000 and preferably in the range from 2,000 to 15,000.

Component (b) of the binder combinations according to the invention may be selected from organic compounds containing at least one structural unit corresponding to the formula

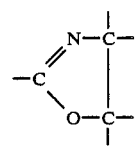

preferably from 4,5-dihydrooxazoles corresponding to the following general formula

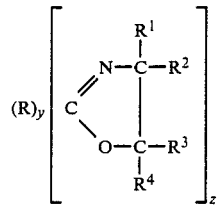

in which
R is hydrogen or a z-functional hydrocarbon radical optionally containing olefinic double bonds, ether and/or hydroxyl groups, preferably an aliphatic or cycloaliphatic hydrocarbon radical containing from 1 to 25 and more especially from 2 to 8 carbon atoms, $R^1$, $R^2$, $R^3$ and $R^4$ may be the same or different and represent hydrogen, alkyl radicals containing from 1 to 5 carbon atoms or aryl radicals containing from 6 to 10 carbon atoms, although preferably at least $R^1$ and $R^2$ and, more preferably, all the substituents $R^1$ to $R^4$ are hydrogen and preferably at most one of the substituents is an aryl group, y is 1 or, where z=2, may also be 0 and
z is an integer of from 1 to 5, preferably 1 or 2.

4,5-Dihydrooxazoles suitable for the process according to the invention are, for example, 4,5-dihydrooxazole, 2-methyl-4,5-dihydrooxazole, 2-ethyl-4,5-dihydrooxazole, 2-propyl-4,5-dihydrooxazole, 2-butyl-4,5-dihydrooxazole, 2-vinyl-4,5-dihydrooxazole, 2-(1- methylvinyl)-4,5-dihydrooxazole, 2,2'-bis-[2-(4,5-dihydrooxazole)], 1,2-bis-[2-(4,5-dihydrooxazolyl)]-ethane, 1,3- or 1,2-bis-[2-(4,5-dihydrooxazolyl)]-propane, 1,3- or 1,4-bis-[2-(4,5-dihydrooxazolyl)]-butane, 1,5-bis-[2-(4,5-dihydrooxazolyl)]-pentane, 1,6-bis-[2-(4,5-dihydrooxazolyl)]-hexane, 1,4-bis-[2-(4,5-dihydrooxazolyl)]-cyclohexane, 1,8-bis-[2-(4,5-dihydrooxazolyl)]-octane, vinyl copolymers of 2-vinyl-4,5-dihydrooxazoles with styrene and acrylates.

Bis-[2-(4,5-dihydrooxazoles)] of the type mentioned by way of example are particularly preferred as component (b).

Component (c) is preferably ammonia or an organic amine containing a primary or secondary amino group. The compounds preferably used as component (c) are those corresponding to the following general formula $$R^5—NH—R^6$$

in which $R^5$ is an aliphatic hydrocarbon radical with a total of 1 to 12 carbon atoms optionally containing ether bridges or tertiary amine nitrogen atoms as bridge members and/or optionally hydroxyl groups as substituents and $R^6$ is hydrogen or a radical corresponding in its definition to the definition of $R^5$.

Suitable components (c) are, for example, ammonia, methylamine, ethylamine, n-propylamine, n-butylamine, tert.-butylamine, ethanolamine, diethanolamine, 1-amino-3-(dimethylamino)-propane, di-n-butylamine or N-methyl aminoethanol.

Although primary or secondary polyamines may also be used in principle, this does result easily in gelatinization of the mixture so that the co-use of higher polyamines such as these is less preferred.

In the binder combinations according to the invention, the quantities in which components (a) and (b) are used are selected so that the molar ratio of carboxylic anhydride groups of component (a) to 4,5-dihydrooxazole groups of component (b) is from 0.5:1 to 2:1 and preferably from 0.8:1 to 1.2:1. In a particularly preferred embodiment, the components are used in equivalent quantities.

The quantity of component (c) in the binder combinations according to the invention is from 0.005 to 6% by weight and preferably from 0.01 to 3% by weight, based on the weight of components (a) and (b).

The production of the binder combinations according to the invention is preferably carried out in the usual solvents such as, for example, ethanol, propanol, butanol, methyl ethyl ketone, ethyl acetate, butyl acetate, technical methoxypropyl acetate, dimethyl formamide, methoxybutyl acetate, dimethyl formamide, N-methyl pyrrolidone, xylene or mixtures of such solvents; water may also be used as part of the solvent.

To produce the binder combinations according to the invention, component (b) is generally added in bulk or in solution to component (a) dissolved beforehand, followed by addition of component (c). However, the reaction accelerator (c) may also be added together with, i.e. in admixture with, component (b) to component (a). The binder combinations according to the invention obtained in this way are valuable binders for the production of flat materials of various kinds. Depending on the chemical constitution of component (a) and (b) and on the type and quantity of component (c), the systems represent two-component binders which harden over a period of from a few seconds to a few days at room temperature.

In the context of the invention, the expression "flat material" is intended to encompass both paint coatings on such substrates as, for example, metals, wood, paper, textiles, leather or mineral substrates, and also glass fiber sizes and adhesive films on substrates to be bonded to one another. Accordingly, the binder combinations according to the invention are suitable for the production of paint coatings on substrates of the type mentioned by way of example, for finishing leather, for the production of glass fiber sizes or even for the production of composite materials by bonding of substrates of various kinds.

The binder combinations according to the invention are preferably used in coating compositions for the production of paint coatings. In this preferred variant of the process according to the invention, the binder combinations according to the invention may be used not only together with the solvents generally present in any case, but also together with the auxiliaries and additives typically used in coating technology, such as for example levelling aids, fillers, pigments and the like.

In the following Examples, all percentages are by weight.

EXAMPLE 1

167 g of a 60% solution of a copolymer, average molecular weight Mw 12,000, of 10% maleic anhydride, 30% styrene, 30% methyl methacrylate and 30% butyl acrylate in butyl acetate are diluted with 86 g of a xylene/butyl acetate mixture (1:1). 8 g 1,4-bis-[2-(4,5-dihydrooxazolyl)]-butane are then added in the form of a 50% solution in methyl ethyl ketone containing approximately 0.15% aminoethanol. Equivalent ratio of anhydride groups to dihydrooxazole groups 1.25:1.

The clear lacquer knife-coated onto a glass plate in a layer thickness of 120 μ shows the following properties after a drying time (23° C.) of 24 h to 5 days.

|  | 24 h | 5 d |
|---|---|---|
| Pendulum hardness [s] (DIN 53157) | 80 | 108 |
| Gasoline resistance (gasoline-impregnated cotton wool plug, contact time 1 or 5 minutes: 0 = unchanged, 5 = destroyed) | 1/5 | 0/1 |

COMPARISON EXAMPLE 1

The procedure is as in Example with the only difference that no primary amine (aminoethanol) is added to the solution. The clear varnish knife-coated onto a glass plate in a layer thickness of 120 μ shows the following properties after a drying time (23° C.) of 24 h or 5 days:

|  | 24 h | 5 d |
|---|---|---|
| Pendulum hardness [s] (DIN 53157) | 64 | 74 |
| Gasoline resistance (gasoline-impregnated cotton wool plug, contact time 1 or 5 minutes: 0 = unchanged, 5 = destroyed) | 2/5 | ⅓ |

EXAMPLE 2

2.3 g 1,4-bis-[2-(4,5-dihydrooxazolyl)]-butane dissolved in 5.3 g acetone are added to 52 g of a copolymer, molecular weight Mw 10,000, of 11% maleic anhydride, 15% styrene, 32% methyl methacrylate, 42% n-butyl acrylate in the form of a 65% solution in a mixture of xylene and butyl acetate (1:1). 0.35 g aminoethanol is then added as reaction accelerator. The solution of the binder combination gels after 5 h at room temperature.

COMPARISON EXAMPLE 2

The procedure is as in Example 2 with the only difference that no aminoethanol is added to the solution. The solution of the binder combination only gels after 52 h at room temperature.

EXAMPLE 3

4.6 g 1,4-bis-[2-(4,5-dihydrooxazolyl)]-butane dissolved in 10.6 g acetone are added to 52 g of the copolymer of Example 2 in the form of a 65% solution in a mixture of xylene and butyl acetate (1:1). 0.7 g aminoethanol is then added as reaction accelerator. The paint binder mixture gels in 1 hour at room temperature.

EXAMPLE 4

10 g 1,4-bis-[2-(4,5-dihydrooxazolyl)]-butane dissolved in 30 g dimethyl formamide are added to 48 g of a copolymer, molecular weight Mw 8,000, of 20% maleic anhydride, 15% styrene, 27% methyl methacrylate and 38% butyl acrylate in the form of a 60% solution in methoxypropyl acetate. 3 g propylamine are then added as reaction accelerator. The paint binder mixture gels after 2 h.

EXAMPLE 5

10 g 1,2-bis-[2-(4,5-dihydrooxazolyl)]-ethane and 0.1 g aminoethanol dissolved in dimethyl formamide are added to 48 g of the copolymer of Example 4 in the form of a 60% solution in methoxypropyl acetate. The paint binder mixture gels in 5 minutes at room temperature.

EXAMPLE 6

10 g 2-ethyl-4,5-dihydrooxazole dissolved in 30 g dimethyl formamide are added to 48 g of a copolymer, molecular weight Mw 7,000, of 25% maleic anhydride, 15% styrene, 17% methyl methacrylate and 33% n-butyl acrylate in the form of a 60% solution in methoxypropyl acetate.

1 g of an ammonia-saturated acetone solution is then added as reaction accelerator. The paint binder mixture gels after 2 h at 23° C.

What is claimed is:
1. In improved binder combinations of
 (a) polymers containing intramolecular carboxylic anhydride groups and having an average molecular weight of from 500 to 25,000 and
 (b) organic compounds containing 4,5-dihydrooxazole groups in a quantity corresponding to an equivalent ratio of carboxylic anhydride groups to 4,5-dihydrooxazole groups of from 0.5:1 to 2:1,
 the improvement comprises said combinations having a content of from 0.005 to 6% by weight, based on the weight of components (a) and (b), of ammonia, a primary amine or secondary amine.
2. Binder combinations as claimed in claim 1 which contain at least one amine compound corresponding to the formula

$$R^5-NH-R^6$$

in which
 $R^5$ is a hydrocarbon moiety with a total of 1 to 12 carbon atoms with or without ether bridges or tertiary amine nitrogen atoms as bridge members and which is unsubstituted or substituted by hydroxyl and
 $R^6$ is hydrogen or a moiety corresponding to the definition of $R^5$.
3. Binder combinations as claimed in claim 2 wherein $R^5$ is alkyl having 1 to 12 carbon atoms unsubstituted or substituted by hydroxyl.
4. Binder combinations as claimed in claim 2 wherein the amine compound is methyl amine, ethyl amine, n-propyl amine, n-butyl amine, tert.-butylamine, ethanol amine, diethanol amine, 1-amineo-3-(dimethylamino)-propane, di-n-butyl amine or N-methyl aminoethanol.
5. Binder combinations as claimed in claim 1 in the form of a solution with a solvent comprising ethanol, propanol, butanol, methyl ethyl ketone, ethyl acetate, butyl acetate, methoxypropyl acetate, dimethyl formamide, methoxy butyl acetate, N-methyl pyrrolidone, xylene or mixtures thereof.
6. Binder combinations as claimed in claim 5 which also contain water as part of the solvent.

* * * * *